United States Patent
Shoji et al.

(10) Patent No.: US 7,763,352 B2
(45) Date of Patent: Jul. 27, 2010

(54) FERROMAGNETIC POWDER, AND COATING MATERIAL AND MAGNETIC RECORDING MEDIUM USING SAME

(75) Inventors: Yoshiyuki Shoji, Okayama (JP); Toshihiko Ueyama, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 638 days.

(21) Appl. No.: 11/520,624

(22) Filed: Sep. 14, 2006

(65) Prior Publication Data

US 2007/0059557 A1 Mar. 15, 2007

(30) Foreign Application Priority Data

Sep. 15, 2005 (JP) .............................. 2005-268792

(51) Int. Cl.
*G11B 5/66* (2006.01)
(52) U.S. Cl. .................................... 428/402; 428/842.1
(58) Field of Classification Search ....................... None
See application file for complete search history.

(56) References Cited

U.S. PATENT DOCUMENTS 7,291,409 B2 * 11/2007 Kuse et al. ............... 428/842.9
2003/0118868 A1 6/2003 Okinaka et al.

FOREIGN PATENT DOCUMENTS

| JP | 10-340805 | 12/1998 |
|---|---|---|
| JP | 2001-067641 | 3/2001 |
| JP | 2001-283421 | 10/2001 |
| JP | 2003-123226 | 4/2003 |
| JP | 2003-242624 | 8/2003 |
| JP | 2003-296915 | 10/2003 |

* cited by examiner

*Primary Examiner*—Holly Rickman
(74) *Attorney, Agent, or Firm*—Clark & Brody

(57) ABSTRACT

A magnetic powder is provided composed of particles having a balanced shape and distribution, the particles having a small, uniform volume, making it possible to achieve improved density and reliability of a coating type magnetic recording medium. The magnetic powder has Fe as a main component, and is comprised of particles having a cross-section perpendicular to the particle major axis that is substantially round or elliptical, wherein a standard geometrical deviation indicating the variation in cross-sectional area thereof is within the range of 1.01 to 3.0. The invention is also directed to a magnetic powder in which the standard geometrical deviation indicating the variation in the particle volume is within the range of 1.01 to 4.0, and the standard geometrical deviation indicating variation in the flat acicularity is within 1.01 to 2.0.

9 Claims, No Drawings

_US 7,763,352 B2_

FERROMAGNETIC POWDER, AND COATING MATERIAL AND MAGNETIC RECORDING MEDIUM USING SAME

FIELD OF THE INVENTION

The present invention relates to ferromagnetic powder for use in a magnetic layer of a multilayer coating type magnetic recording medium, and to a coating material and magnetic recording medium using same.

DESCRIPTION OF THE PRIOR ART

Recording media are becoming increasingly compact and high capacity. There are various types of recording media in addition to the conventional Floppy (Trademark) Disk (FD), such as the Compact Disc (CD), Digital Versatile (Video) Disc (DVD), Compact Flash (Trademark) and Memory Stick (Trademark), in respect of which development continues with the aim of providing higher capacity in a smaller package.

One type of magnetic recording medium is coating type magnetic recording medium that is manufactured by coating the surface of a film with magnetic powder. While it depends on the cost of the materials used, in terms of capacity the coating type magnetic recording medium has a better cost performance than other recording media, which has led to its widespread use in high capacity backup systems. While coating type magnetic recording media are already being produced having recording capacities in the order of several hundred gigabytes (GB) per reel, even higher capacities are needed.

DESCRIPTION OF THE PRIOR ART

Recording media are becoming increasingly compact and high capacity. There are various types of recording media in addition to the conventional Floppy™ Disk (FD), such as the Compact Disc (CD), Digital Versatile (Video) Disc (DVD), Compact Flash (R) and Memory Stick (R), in respect of which development continues with the aim of providing higher capacity in a smaller package.

To achieve higher capacities in a smaller space, it is necessary to design media that enable higher density recording. Ways of doing this include improving the properties and refining the particles of the magnetic powder used to make magnetic recordings, and optimizing other materials used to constitute the media. Refining the size of the particles of the magnetic powder is of particular importance for achieving high capacity, and as such is something that is emphasized in the design of coating type magnetic recording media.

However, while refining the size of the magnetic powder particles increases the recording capacity, the increase in the surface area caused by the refinement also increases the surface activity, degrading the oxidation stability and markedly reducing the metal portion needed to ensure the magnetism. Because this deterioration in the metal portion caused by the reduction in the metal portion leads to a decrease in recording capacity, it is important to use measures to utilize the size of the particles as much as possible to maximize the magnetic properties obtained.

The rising density of information densities brings with it the problem of increased noise arising from the medium itself. Noise can be broadly divided into particle noise generated by the magnetic particles themselves, and surface noise arising from the surface of the medium. Since the particles have the definite largeness, particle noise is an unavoidable phenomenon, and the major focus in this regard is on how best to reduce such noise so that it does not adversely affect magnetic recording.

Improvement methods, from the standpoint of medium structure, include that disclosed by JP 2001-67641A (Reference 1) in which a two-layer magnetic structure is formed on a non-magnetic layer and the packing properties of the two-layer magnetic structure are improved by giving the upper layer a saturation magnetization value and a particle volume larger than that of the lower layer, reducing the overall noise and thereby improving the C/N noise ratio.

Various methods are being studied to reduce particle noise. For example, JP 2003-296915A (Reference 2) discloses specifying the amounts of elements contained in the particles and defining rare-earth element amounts with respect to the specific surface area calculated from the crystallite size and the average length of the major axis, to thereby improve the dispersibility and the electromagnetic conversion characteristics. The disclosure also pointed out that while noise tended to decrease in the case of crystallites measuring 0.010 µm (10 nm) or smaller, due to the destabilization of the crystallization length, there is a decrease in the saturation magnetization and an increase in the specific surface area that make it easier for agglomeration to proceed.

An effective method of reducing total noise from the medium is to decrease particle volume until in practice it is no longer a problem. Technologies that take this into account are described by JP 2001-283421A, JP 2003-123226A, and JP 2003-242624A (References 3 to 5).

In the case of the technologies disclosed in References 3 to 5, the volumes of the particles concerned are averages, permitting the existence of particles that are quite a bit larger and smaller than the average. In practice, large variations in the distribution of particle diameters are produced by the particle refinement, with the decrease in output and increase in noise thus produced exceeding the decrease in particle noise produced by the decrease in particle volume. For example, in a case in which there is a decrease in the effective volume of the magnetic powder, reducing the saturation magnetization and the coercive force, and there are also variations in the volume of the metal portion, the coercive force has a broad distribution. The variation in particle volume is greatly affected by the particle diameter distribution. A magnetic recording medium manufactured using particles having a large particle diameter distribution will have a poor C/N ratio, and can include particles that are insufficiently magnetized and are therefore unable to retain information. That is to say, it is possible that the backup function of the medium may be lacking, which would be fatal for a magnetic recording medium.

OBJECT OF THE INVENTION

Therefore, in endeavoring to increase the density of a coating type magnetic recording medium, it is important to apply magnetic powder that does not cause the type of drop in reliability described above, so there is a strong need for such a magnetic powder. The present invention is therefore directed to providing a magnetic powder that can meet such a need.

SUMMARY OF THE INVENTION

The inventors conducted detailed experiments, and found that it was possible to improve both the density and reliability of a coating type magnetic recording medium by using fine, metal, magnetic powder in which the shape and size of the particles constituting the magnetic powder are adjusted to be within one of the following ranges of variation i) to v).

i) A magnetic powder having Fe as a main component comprised of particles having a cross-section perpendicular to particle major axis that is substantially round or elliptical, in which a standard geometrical deviation indicating variation in cross-sectional area thereof is within a range of 1.01 to 3.0.

ii) A magnetic powder having Fe as a main component comprised of particles having a cross-section perpendicular to particle major axis that is substantially round or elliptical, in which a standard geometrical deviation indicating variation in particle volume thereof is within a range of 1.01 to 4.0.

iii) A magnetic powder having Fe as a main component comprised of particles having a cross-section perpendicular to particle major axis that is substantially round or elliptical, in which a standard geometrical deviation indicating variation in major width thereof is within a range of 1.01 to 2.0.

iv) A magnetic powder having Fe as a main component comprised of particles having a cross-section perpendicular to particle major axis that is substantially round or elliptical, in which a standard geometrical deviation indicating variation in minor width thereof is within a range of 1.01 to 2.0.

v) A magnetic powder having Fe as a main component comprised of particles having a cross-section perpendicular to particle major axis that is substantially round or elliptical, in which an average flat acicularity (major width/minor width) is within a range of more than 1.0 to 2.5, and a standard geometrical deviation indicating variation in said flat acicularity is within a range of 1.01 to 2.0.

Here, major width refers to the maximum particle width perpendicular to the major axis. Minor width is the smallest width of a particle image of a particle mounted on the sample stage of an electron microscope inclined at an angle of 90° from the state in which the major width is observed. Flat acicularity is the major width/minor width ratio. Whether or not the particle cross-section perpendicular to the major axis is substantially round or elliptical can be determined from the shape of a cross-section having a major axis. A shape that is substantially round means one with a cross-section having a major diameter/minor diameter ratio in the range of 1 to 1.3, and a shape that is substantially elliptical means one with a cross-section having a major diameter/minor diameter ratio in the range from more than 1.3 to approximately 3.

Of such magnetic powders, the following are particularly suitable.

[i] Those comprised of particles having an average major axis length of not more than 100 nm and a C/D ratio between the Fe (110) crystallite diameter C and average major width D that is larger than 1.

[ii] Those comprised of particles having an Fe (110) crystallite diameter of not more than 12 nm and a TAP density of 0.30 g/cc or more.

[iii] Those with a powder pH of from 6 to 10, measured in accordance with the boiling method of JIS K 9101.

[iv] Those that, when 1 g of the magnetic powder is maintained in 100 ml of pure water for 5 minutes at 100° C., an amount of eluted Al is not more than 100 ppm.

[v] Those formed of iron oxyhydroxide as a starting material (precursor) obtained by a process comprising reacting a ferrous and cobalt salt solution with an alkali hydroxide solution and, following neutralization, adding an excess of alkali carbonate to form iron carbonate, which is matured to be thermoformed; and then adding an oxidizing agent in an amount adjusted to oxidize up to 25% of the total Fe component ($Fe^{2+}$) in the solution as forming iron oxyhydroxide, that is, to effect an Fe ion oxidation ratio of up to 25%, to accelerate the formation of iron oxyhydroxide nuclei, after which the iron oxyhydroxide is grown while being doped with an aqueous solution of aluminum within an oxidation ratio of up to 85%, and, following the completion of the oxidation, coating with rare earth elements (defined to include Y).

The present invention also provides a magnetic coating material containing the above magnetic powder, and a magnetic recording medium in which the above magnetic powder is used to form a magnetic layer.

In accordance with this invention, a magnetic powder is provided constituted of fine particles having a regulated particle diameter and particle volume. When this magnetic powder is used to form the magnetic layer of a coating type magnetic recording medium, it enables noise produced by the magnetic particles themselves to be markedly reduced, so that while the output of the magnetic recording medium may be the same, the C/N ratio is improved.

DESCRIPTION OF THE PREFERRED EMBODIMENTS

To achieve a coating type magnetic recording medium having both higher density and reliability, the present invention provides magnetic powder with excellent magnetic properties, having a regulated particle shape and distribution and a small, uniform particle volume. Based on various studies, the inventors found that a magnetic powder that enables the above object to be attained cannot be defined using just the usual measured values such as average particle diameter and average particle volume, but by using indices that show the geometrically analyzed particle size distribution; that is, by using standard geometrical deviation values relating to particle shape and size. The inventors also found that magnetic powder having the required standard geometrical deviation values could be produced by devising a method of manufacturing the iron oxyhydroxide constituting the precursor to be used for producing the magnetic powder. Specifically, the precursor iron oxyhydroxide that enables the manufacture of magnetic powder having the required standard geometrical deviation values can be obtained by employing a method in which the crystal nuclei of the precursor is rapidly precipitated by the addition of a strong oxidizing agent, not by the conventional method of oxidation using an oxygen-containing gas at the stage at which the crystal nuclei are precipitated, then followed to make moderate oxidation continue to growth the crystal nuclei up to obtain the desired dimension that enables the manufacture of magnetic powder having the required standard geometrical deviation values. The present invention was accomplished based on these findings. Below, the items required for defining the invention are explained.

It is desirable for the particles of the magnetic powder of the invention to have a flat acicular shape. As described in JP 10-340805A (Reference 6), particles having a flat acicular shape are those that have an acicular aspect when viewed from a direction perpendicular to the major axis of the particle (that is, when viewed from the side); particles that have a major axis and a minor axis, but with two kinds of width in across-section cut perpendicular to the major axis, a major width and a minor width. That is to say, the cross-section is not perfectly round, but has a shape in which the ratio between the major width and the minor width is greater than 1.0. The flat acicularity is a value in a case in which the ratio between the major width and the minor width is measured particularly in a cross-section having the longest width. Herein, this longest width is termed the major width, and the shortest width is termed the minor width. The flat acicularity referred to herein includes particles that are needle shaped, rice crop straw bag shaped, spindle shaped, spheroidal, and shapes similar thereto. Compared to the usual spindle shaped or acicular particles, a flat acicular shape makes it is easier to eliminate pores during calcination and reduction steps, thus obtaining particles followed with the shape of the iron oxyhydroxide starting material. Thus, extremely deformed (such as creased or nicked) particles are almost never seen, so it is possible to obtain magnetic particles having high coercive force.

The magnetic particles preferably have an average flat acicularity of more than 1.0 to 2.5, since that makes it easier to obtain an improvement in particle surface properties by reducing surface pores, thereby improving the dispersibility and surface smoothness of the coated magnetic medium. More preferably, the average flat acicularity is from 1.1 to 2.0, and even more preferably is from 1.2 to 1.8. A transmission electron micrograph can be used to measure the flat acicularity. There are the shadowing method, in which platinum-palladium alloy particles are deposited on particles and a particle shadow produced to calculate the particle thickness, and the inclined method in which particles are put on a mesh, the particle minor width is projected and the sample stage is then inclined 90° to project the major width, to thereby calculate the flat acicularity by measuring the minor width and major width. Here, values obtained by the inclined method are used.

The standard geometrical deviation indicating flat acicularity variation should be from 1.01 to 2.5. If this value is too large, the flat acicularity variation may be too large, which can cause surface irregularities to become too large when the magnetic particles are oriented, degrading the surface smoothness. Conversely, too much uniformity is undesirable, since that can lead to an increase in voids in the magnetic layer. Therefore, a certain degree of flat acicularity is required. To achieve a high level of both smoothness and medium properties, the standard geometrical deviation value indicating the variation in flat acicularity should preferably be from 1.05 to 2.0, and more preferably from 1.10 to 1.9.

It is desirable for the particles to have an average major axis length of not more than 250 nm, more preferably not more than 200 nm, and even more preferably not more than 100 nm. If the particles are too large, it becomes more difficult to apply thin magnetic layer coatings, making it impossible to achieve high densities. In addition the particle volume becomes larger, which is undesirable since it produces a marked increase in particle noise which hinders the achievement of higher density recording. The average major axis length has a lower limit of 10 nm. Particles below that size become super para magnetic, which makes them difficult to magnetize even when a magnetic field is applied, possibly making the particles an inadequate information medium. For reasons similar to those in the case of flat acicularity, the standard geometrical deviation value indicating the variation in major axis length should preferably be from 1.01 to 2.5, more preferably from 1.05 to 2.0, and even more preferably from 1.10 to 1.9.

The average minor axis length of the particles is the same as the minor axis when the flat acicularity is being measured, but it is desirable for the particles to have an average minor axis length of not more than 20 nm, more preferably not more than 15 nm, and even more preferably not more than 10 nm. Too large an average minor axis length (i.e., the particles are too wide) produces a marked increase in particle volume. For the same volume of magnetic layer, a larger particle volume means that fewer particles can be packed into the layer, so an increase in particle volume gives rise to an increase in particle noise. When this happens in the case of acicular particles having a substantially round or elliptical shape, the particle volume is affected strongly by the minor axis value (in particular, the minor width) rather than the major axis value. For this reason, it is desirable for the average minor axis length (average minor width) to be as small as possible. For reasons similar to those in the case of flat acicularity, the standard geometrical deviation value indicating the variation in minor width and the standard geometrical deviation value indicating the variation in major width should each preferably be from 1.01 to 2.5, more preferably from 1.05 to 2.0, and even more preferably from 1.10 to 1.9.

The standard geometrical deviation value indicating the variation in particle cross-sectional area should preferably be from 1.01 to 3.0, more preferably from 1.05 to 2.5, and even more preferably from 1.1 to 2.0. When an ideal magnetic particle orientation is assumed, the packing quality in the thickness direction of the magnetic particles may be determined by the form of the cross-section perpendicular to the major axis, so it is necessary to pay attention to the cross-sectional area distribution. Too large a particle cross-sectional area distribution is undesirable with respect to the magnetic properties, especially the magnetic distribution. On the other hand, if the cross-section area distribution of the particles is too uniform, it will degrade the packing of the magnetic particles, reducing the number of particles per unit volume and thereby degrading the C/N ratio of the medium. Therefore, a certain degree of variation of the cross-sectional area is desirable. Here, for the particle cross-sectional area, based on the method of calculating the area of an ellipse, the value used is one obtained by $\frac{1}{4} \times \pi \times$major width$\times$minor width.

Reducing the particle volume is an effective way of preventing degradation of the C/N ratio. However, if the volume becomes too small, it reduces the magnetic properties, especially the saturation magnetization, which is undesirable since it leads to a marked decrease in output. For that reason, it is desirable for the average volume to be 250 $nm^3$ or more, and more preferably 500 $nm^3$ or more. On the other hand, too large a particle volume causes an increase in particle noise, so the average volume should not be larger than 20000 $nm^3$, and more preferably not larger than 15000 $nm^3$.

The standard geometrical deviation indicating the variation in particle volume should preferably be from 1.01 to 4.0, more preferably from 1.05 to 3.5, and even more preferably from 1.1 to 3.0. If this standard geometrical deviation is too large, while there will be numerous small particles in the spaces between large particles, which is advantageous in that the packing is improved by the increase in the amount of magnetic particles per unit volume, it is undesirable because of the deterioration in the distribution of the coercive force of the magnetic powder, which in turn makes the SFD value of the medium worse Conversely, if the particle volume distribution is in a narrow range, the coercive force distribution of the medium becomes smaller, slightly improving the SFD value but slightly degrading the packing of the magnetic powder in the magnetic layer due to the uniformity of the particle distribution, making it easier for the C/N ratio to be degraded with the decrease in the number of magnetic particles per unit volume. Therefore, a certain degree of variation of the particle volume is desirable. Here, for the particle volume of flat acicular particles, the value used is one determined by multiplying the area of the cross-section perpendicular to the major axis by the length of the major axis.

The crystallite diameter of Fe (110), the measuring method being mentioned hereinafter, is preferably not more than 12 nm, more preferably not more than 11.5 nm, and even more preferably not more than 10 nm. A large crystallite diameter is undesirable from the standpoint of high density recording, since it increases the noise. Reducing the crystallite diameter has the direct effect of reducing the noise level, so the crystallite diameter should be as small as possible. However, it is undesirable to reduce the diameter to the point where a unit magnetic domain cannot hold the magnetism. Therefore, the lower limit of the crystallite diameter in the Fe (110) is 5 nm, more preferably 6 nm, and even more preferably 7 nm. In addition, it is desirable for the crystallite diameter C of each particle to be larger than the average major width value D. That is, for a powder it is desirable that C/D be larger than 1. Satisfying that requirement makes it possible to provide a magnetic powder having a balance between output and noise.

With respect to the composition of the magnetic powder, the subject magnetic powder is one in which the atomic ratio of Co to Fe (hereinbelow referred to as the Co/Fe atomic ratio) is from 0 to 50 at %, more preferably from 5 to 45 at %, and even more preferably from 10 to 40 at %. Within this range, stable magnetic properties are easy to obtain and the weatherability is good. Also, it is preferable that there is no elution of Co when the magnetic powder is boiled in water. When there is a high content of hot-water-soluble Co, it means that the Co in the magnetic powder is not sufficiently solidified as solid solution, which is undesirable since it destabilizes the magnetic properties. It is necessary to keep the amount of Co that is eluted by hot water to not more than 30 ppm.

The subject magnetic powder is also one given Al in solid solution in a range that provides, with respect to the powder, a total Al content of 10 mass %. The Al solid solution is effective at preventing particle sintering during the calcination and heating reduction steps, and at improving the weatherability. However, Al is a non-magnetic component, and too much in solid solution is undesirable as it causes shape deformation and the increase of the non-magnetic component attenuates the magnetic properties. The total Al content of the powder is preferably from 0.1 to 10 mass %, more preferably from 0.5 to 9 mass %, and even more preferably from 1 to 7 mass %.

It is desirable that there be little Al elution when the magnetic powder is boiled in water. The amount of Al eluted at this time is an indicator of whether or not an adequate level of Al solid solution has been achieved. That is, a large amount of Al elution means that there is not enough solid solution to obtain an effective anti-sintering function, and that the weatherability will not be reliable. Specifically, it was found that a good anti-sintering function could be ensured when, after 1 g of the magnetic powder is maintained in 100 ml of pure water for 5 minutes at 100° C., the amount of eluted Al is not more than 100 ppm. An amount of eluted Al that is not more than 50 ppm is more preferable, and not more than 20 ppm is even more preferable.

Moreover, the subject magnetic powder is also one with rare earth elements added in a range that provides, with respect to the powder, a total rare earth element content of 20 mass %. Adding rare earth elements imparts effective anti-sintering during heating reduction step to obtain the magnetic powder. Particularly in the case of fine particles, which sinter more readily, adding rare earth elements is highly effective for preventing sintering. The amount of rare earth elements added should not be too high, since that will attenuate the magnetic properties and may contaminate the head by sticking to the head when the head slides over the tape. In terms of percentage of the total powder amount, the amount of rare earth elements that should be added is preferably from more than 0 to 20 mass %, more preferably from 0.1 to 17 mass %, and even more preferably from 0.5 to 15 mass %. Here, Sc and Y are regarded as rare earth elements. Any rare earth element will be effective for preventing sintering, but Y, La, Sc, Yb, Gd and Nd and the like are particularly effective.

The magnetic powder may also contain alkali earth metals, which are also effective at preventing sintering. The alkali earth metals may be intentionally added, or can be those mixed in from the ferrous salt, cobalt salt, aluminum salt or rare earth salt of the starting material. Care must be exercised, because if the alkali earth metal content is too high, over time it can react with the binder and the like in the medium to form salts that degrade storage stability of the medium. The effects can show up particularly dramatically when the alkali earth metals are contained as a water-soluble component. In terms of percentage of the total powder amount, the alkali earth metal content is preferably from more than 0 to 0.5 mass %, more preferably from 0.01 to 0.3 mass %, and even more preferably from 0.01 to 0.1 mass %. Whichever the alkali earth metal used, when 1 g of the magnetic powder is maintained in 100 ml of pure water for 5 minutes at 100° C., the amount of the alkali earth metal that is eluted is preferably not more than 100 ppm, more preferably not more than 50 ppm, and even more preferably is not more than 50 ppm.

It is desirable for the magnetic powder to have the following properties.

As calculated by the BET method, the specific surface area of the particles is preferably from 30 to 250 $m^2/g$, more preferably from 45 to 200 $m^2/g$, and even more preferably from 50 to 150 $m^2/g$. It is undesirable to have too large a BET specific surface area, since it degrades the compatibility with the binder and hinders good dispersibility of the particles, causing agglomeration at the production of the coating type magnetic recording medium. While the compatibility with the binder can be improved by various methods such as modifying the dispersion conditions or adjusting the amount of dispersion agent that is added, this can change the balance of the amounts of materials in the coating, degrading storage stability and the like. On the other hand, a very small BET specific surface area can cause sintering of the particles which, by exacerbating medium surface irregularities, degrades the electromagnetic conversion characteristics.

The TAP density of the particles calculated by the TAP method is preferably 0.30 g/cc or more, more preferably 0.35 g/cc or more, and even more preferably 0.40 g/cc or more. If the TAP density is too low, there will be inadequate packing of the powder particles with respect to the magnetic layer, with the smaller amount of magnetic powder per unit volume reducing the C/N ratio.

Powder pH as measured by the boiling method of JIS K 9101 is preferably from 6 to 10, more preferably from 7 to 9.5 and even more preferably from 7.5 to 9.5. Too high or too low a pH is undesirable, since it degrades the compatibility of the particles with the binder in which the particles are dispersed, making it impossible to obtain good medium surface properties, and hence good medium properties. Extreme acidity or basicity can lead to changes over time that degrade the storage stability, so in such cases it is necessary to adjust the powder pH to a suitable level. Methods of adjusting the pH include a method using wet processing after reduction, and a method in which elements contained in the particles are adjusted at the stage at which precursors are formed from the starting materials. Either of these methods may be used.

The ignition onset temperature of the powder is preferably 100° C. or higher, more preferably 110° C. or higher, and even more preferably 120° C. or higher. The ignition onset temperature can be ascertained as the time at which the weight of the magnetic powder being monitored start to increase when the powder is heated by a TG-DTA apparatus at a temperature elevation rate of 10° C./min. The higher the ignition onset temperature is, the more stable the powder. Too low a temperature indicates an insufficient or uneven stabilization of the magnetic powder. That is to say, a low ignition onset temperature, as measured by this method, is undesirable since it can mean the magnetic powder has inadequate long-term storage stability. Also, while a high ignition on set temperature is desirable, attention must be paid to the fact that just increasing the oxidation level can elevate the ignition onset temperature by increasing the thickness of the oxidation film. Therefore, care must be taken to achieve a balance between the powder saturation magnetization as and ignition onset temperature and design magnetic powder that provides the required magnetic properties.

The magnetic properties of the particles vary depending on particle shape and size, but the range of the saturation magnetization as is preferably 10 to 150 $Am^2/kg$ (10 to 150 emu/g), more preferably 20 to 135 $Am^2/kg$ (20 to 135 emu/g), and even more preferably 30 to 120 $Am^2/kg$ (30 to 120 emu/g). Bulk coercive force Hc is preferably from 39.8 to 318.4 kA/m (500 to 4000 Oe), more preferably from 59.7 to 278.6 kA/m (750 to 3500 Oe), and even more preferably from 79.6 to 238.8 kA/m (1000 to 3000 Oe). If these values are too high or too low, the magnetic recording medium will have inferior electromagnetic conversion characteristics.

The magnetic powder having the above forms and properties can be manufactured as described below, for example.

The iron oxyhydroxide precursor is produced by first adding a ferrous salt to an aqueous solution of carbonate to form iron carbonate (a caustic alkali may also be added, if required). Usually, an oxygen-containing gas is passed therethrough to effect the oxidation reaction and produce particle nuclei of the iron oxyhydroxide. However, the present invention does not use that method, but instead uses a strongly oxidizing agent to reduce the time it takes to produce the nuclei. The strong oxidizing agent may be any general, known oxidizing agent, such as, for example, a hydrogen peroxide solution, an aqueous solution of potassium permanganate, an aqueous solution of potassium dichromate, and so forth. These oxidizing agents are not limited to being added in the form of an aqueous solution, but an aqueous or other such liquid solution is preferable to help keep the reaction as uniform as possible. It is desirable to add the oxidizing agent in an amount adjusted to oxidize (oxyhydroxidate) 5 to 25% of the total Fe ions ($Fe^{2+}$) in the solution. It is undesirable to add the solution in a form whereby just part of the reaction proceeds in a concentrated way in the solution. Instead, it has to be adjusted so that the solution permeates as uniformly as possible. It is desirable to adjust the oxidation ratio at this stage to less than 25% with respect to the target particle size, more desirably to less than 20% with respect to the total oxidation time, even more desirably to less than 17%, and yet more desirably to less than 15%. The temperature used when forming the nuclei is also taken into consideration as a particle-control factor. Too high a temperature is undesirable since the particles will lose shape and magnetite will be formed. Therefore the nuclei formation temperature used should be not more than 75° C., preferably not more than 70° C., and more preferably not more than 65° C.

Preferably the next oxidation should proceed gradually, so the next step should be carried out using an oxygen-containing gas such as air. This should be done at not more than 90° C., preferably not more than 85° C., and more preferably at not more than 80° C. up to the growth completion of the iron oxyhydroxide particles grown on the nuclei. Moreover, it is preferable to add Al during the oxidation so that Al permeates the iron oxyhydroxide and forms a solid solution therein. At this time, Al doping should be carried out to effect an oxidation ratio of up to 85%, and preferably of from 30 to 70%. In cases where the amount of Co introduced is deliberately increased, it can be gradually added at this stage to form a solid solution.

In addition to components that are unavoidably included when the magnetic particles of this invention are manufactured, there elements that have to be added to improve dispersibility in the binder and magnetic properties. Examples of such elements are Si, Zn, Cu, Ti, and Ni. However, adding such elements in large quantities can upset the balance of the magnetic properties and the like, so it is necessary to add the elements according to the required particle properties.

Rare earth elements can be added to prevent sintering during heating reduction and to improve the particle size distribution. As shown in the R (rare earth elements)/(Fe+Co) content in the magnetic powder of this invention, but not the mass % in the powder as above, the content is preferably 0 to 25 (at %), more preferably 1 to 20 (at %), and even more preferably 2 to 15 (at %). Too high a rare earth element content is undesirable since, as in the case of Al, it greatly reduces the saturation magnetization. Rare earth elements that can be used include Y, Sc, Gd, Yb, La and so forth. Selection is arbitrary, but the inventors found that good magnetic properties are exhibited in the low as regions of elements with higher atomic weights. As such, the suitable rare earth elements may be selected according to purpose. The rare earth elements may be added when the iron oxyhydroxide is grown (in solid solution) or after growth is completed (adhered).

Cobalt-containing iron oxyhydroxide is obtained by the above processes. The iron oxyhydroxide slurry thus obtained is filtered and washed in the usual way, and then subjected to treatment for uniform heating by a known method, it is dried by being heated at from 80 to 300° C., preferably from 120 to 250° C., and more preferably at from 150 to 220° C. for 6 hours or more in an inert gas or in air to thereby obtain dry, solid iron oxyhydroxide. Using a known method, the solid is heated at a temperature of from 250 to 700° C., whereby the Co-containing iron oxyhydroxide is changed by dehydration to iron oxide such as Co-containing $\alpha$-$Fe_2O_3$. The inclusion of water vapor or carbonic acid or the like in the atmosphere during the heating-dehydration is not prevented.

Next, vapor-phase reduction is used to reduce the iron system oxide at the temperature range of 300 to 700° C. Reducing gases that can be used include carbon monoxide, acetylene and hydrogen. A multistage reduction method can be used in which the temperature is changed from a first-stage temperature to a second-stage temperature. In this multistage reduction, a relatively low temperature is maintained during the first-stage reduction, and the temperature is then elevated and maintained at a relatively high temperature for the second-stage reduction. In this reduction too, the presence of water vapor or carbonic acid in the atmosphere is not prevented.

The alloy powder thus obtained after the reduction is highly active and may ignite if handled as-is in the atmosphere. It is therefore desirable to use a slow oxidation process to form a fine oxide layer on the surface of the particles so they can withstand being handled in the air. To form the fine layer film, the particles should be cooled to a desired temperature of from 50 to 200° C. from the reduction temperature at the end of the heating reduction step and weakly acidic gas introduced to form a stable oxide film. It does not matter if this is done in the presence of carbonic acid or water vapor. If a higher film formation temperature is used, a surface oxide film will form that can resist the time-based deterioration of magnetic properties. However, care is needed because there are cases in which a deterioration in magnetic properties also takes place.

It is important to evaluate the particle size distribution of the particles of the present invention. First, how the particle shape and size are defined will be explained.

—Adjustment of Sample for Observation by TEM—

Some 0.005 g of a measurement sample is added to 10 ml of a 2% collodion solution and dispersed therein, after which one or two drops of the solution are used to adhere a collodion film to one surface of a grid. The film is left to dry naturally and a deposition of carbon vapor is used to strengthen the film. The grid is then used for observation by a transmission electron microscope (TEM).

—Measurement of Flat Acicularity, Length of Major and Minor Axes and Axial Ratio by the Inclined Method—

With respect to the sample above for filming, a transmission electron microscope (TEM) (for example JEM-100 CX made by JEOL Ltd.) to examine the sample in the field of view at an acceleration voltage of 100 kV. A transmission electron micrograph was taken at a ×58,000 magnification, magnified vertically and horizontally to nine times the size, for example, a single particle in the field of view was decided on, the sample stage was inclined and a photograph taken at the inclined position at which, in the particle image, the width at a right-angle to the major axis was at its maximum size (the maximum width at this time corresponding to the major width). Next, the sample stage was inclined 90° from that inclined position and a photograph taken at that inclined position (the maximum width at this time corresponding to the minor width). The two photographs were used to obtain the maximum width at a right-angle to the major axis of the particle image and determine the major axis and minor axis values in each case. Observations and measurements of at least 300 particles of each sample were carried out. Measurements were required to be made in respect of independent particles, so care was taken to select singly distributed particles. The flat acicularity of each particle was determined as being the ratio between the major axis and minor axis. In the photograph used to obtain the major width, the ratio between the major axis length and the major width was obtained and that value used as the axial ratio of that particle.

—Calculation of Standard Geometrical Deviation—

Methods of calculating the standard geometrical deviation of the particle diameters are broadly divided into two. In one, the major axis lengths or minor axis lengths are plotted along the horizontal axis of logarithmic-normal probability graph paper and the cumulative number of individual particles is plotted along the vertical axis. In the other, the major and minor axis lengths are converted into natural logarithms and the standard deviation thereof are mechanically calculated.

In the former method of calculating the standard geometrical deviation of the particle diameters from a graph, the TEM micrographs of the particles are enlarged, the diameters of the particles in the field of view are measured, and the magnification powers at the time the micrograph was taken and at the time it was enlarged are compared to calculate the actual particle diameters. Then, using statistical techniques, the diameters are plotted along the horizontal axis of the logarithmic-normal probability graph paper as percentages of the cumulative number of particles (integral plus mesh) belonging to each particle category prescribed along the vertical axis. Reading off from the graph the particle diameter values corresponding to 50% and 84.13%, respectively, of the number of particles show a value calculated in accordance with standard geometrical deviation=particle diameter at an integral plus mesh of 84.13%/particle diameter (geometric average diameter) at an integral plus mesh of 50%.

In the case of the latter method in which the deviation values are calculated mechanically, measured values are converted into common logarithms and the standard deviation therefore obtained by conversion to anti-logarithms. In this invention, the mechanical method is used to calculate the standard geometrical deviation of the major axis, minor axis, (major width, minor width), flat acicularity, particle cross-sectional area and particle volume in respect of the calculated values of the major axis diameter, minor axis diameter (major width, minor width), flat acicularity, particle cross-sectional area and particle volume.

Particle composition and properties can be examined as follows.

—Analysis of Powder Composition—

The amounts of Co, Al and R (rare earth element including Y) were determined using an Iris/AP Inductively Coupled Plasma Spectrometer manufactured by Jarrell Ash Japan, the amount of Fe was determined using a COMTIME-980 Hiranuma Automatic Titrator manufactured by Hiranuma Sangyo Co., Ltd., and the amount of oxygen was determined using a Model TC-436 Nitrogen/Oxygen Determeter manufactured by LECO Corporation. The results of these determinations were provided as weight percentages (wt %), which were converted to atomic percentages (at %) of the elements expressed as a proportional ratio of the at % of Fe and so forth.

Magnetic Properties and Weatherability

A model VSM-7P vibrating sample magnetometer (VSM), manufactured by Toei Kogyo Co., Ltd., was used to measure magnetic properties in an externally applied magnetic field of 10 kOe (795.8 kA/m). Weatherability was evaluated by storing the particles for one week in a thermo-hygrostat at a temperature of 60° C. and a relative humidity of 90%, and then calculating the percentage decrease in saturation magnetization $\Delta\sigma s$ by measuring the saturation magnetization $\sigma s$ (i) prior to such storage and the saturation magnetization $\sigma s$ (ii) after the one week of storage, using the following equation.

$$\Delta\sigma s = 100 \times [\sigma s(i) - \sigma s(ii)]/\sigma s(i)$$

Specific Surface Area

Calculated by the BET method, using a 4-Sorb US manufactured by Yuasa Ionics Inc.

Crystallite Size

A model RAD-2C X-ray diffractometer manufactured by Rigaku Denki Co., Ltd. was used to obtain crystallite size from the following equation. The X-ray peak tends to be broadened in the case of fine particles, so the size was calculated by scanning a measurement range $2\theta$ of 45 to 60°. The scan speed was 5°/min and the number of scans was five.

$$Fe(110) \text{crystallite size} = K\lambda/\beta \cos\theta$$

wherein K is Scherrer constant 0.9, $\lambda$ is X-ray beam wavelength, $\beta$ is half-width value of the refraction peak (radian-diameters), and $\theta$ is angle of refraction (radians).

Powder pH

This was measured by a method conforming to JIS K 5101. In a hard-glass Erlenmeyer flask, 5 g of the sample was added to 100 ml of pure water and the mixture heated to boiling for five minutes and boiled for another five minutes. The boiling resulted in some of the water content being released into the air, so pure water was added to make up for the decrease. To reduce the effect on the pH to be measured, the boiling method was used to remove carbonic acid beforehand from the pure water added, and the amount of pure water was adjusted to 100 ml. The flask was then closed and left to cool to room temperature, after which the pH of the aqueous suspension was measured in accordance with the method of JIS Z 8802.

Ignition Temperature

The ignition onset temperature was measured as the ignition point by taking the temperature at which the weight of the particles started to increase. This analysis was done using a TG/DTA apparatus, the TG/DTA 6300 manufactured by Seiko Instruments Inc., to for measurements and an Exstar 6000 data analyzer to analyze the measurement data. Measurement was done by placing 1.0 mg of the sample in an Al cell and initiating heating of the sample. The increase in sample weight was measured by observing the change in weight of the cell with the sample relative to an empty Al cell. For this, the temperature was elevated at 10° C./min from normal temperature to 300° C. The increase in the weight when this was done was assumed to be an increase produced by the oxidation of the metal portion of the particles.

TAP Density Measurement

TAP density was measured by inserting the magnetic powder into a glass sample cell having a diameter of 5 mm and a height of 40 mm, and tapping it 200 times, using a tap height of 10 cm.

A known method can be used to make the metal magnetic powder of the present invention into a multilayer magnetic recording medium and evaluate performance thereof by measuring the electromagnetic conversion characteristics. An example of the configuration of the multilayer magnetic recording medium and the method of evaluating the medium properties are described below.

Base Film

As the base film, there can be used, for example, a polyester such as polyethylene terephthalate and polyethylene naphthalate, a polyolefine, cellulose triacetate, polycarbonate, polyamide, polyimide, polyamide-imide, polysulfone aramide, aromatic polyamide, or other resin film.

Coating Material of Non-magnetic (Lower) Layer

As the non-magnetic coating material, there can be used, for example, a material composed of 85 parts by mass of non-magnetic powder ($\alpha$-$Fe_2O_3$ made by Dowa Mining Co., Ltd. and having an average major axis particle diameter of 80 nm); 20 parts by mass of carbon black; 3 parts by mass of alumina; 3 parts by mass of vinyl chloride resin (vinyl chloride based binder MR-110 manufactured by Zeon Corporation); 15 parts by mass of polyurethane resin (UR-8200 manufactured by Toyobo Co., Ltd.); 190 parts by mass of methyl ethyl ketone; 80 parts by mass of cyclohexanone; and 110 parts by mass of toluene.

Coating of Magnetic (Upper) Layer

As the magnetic coating material, there can be used, for example, a material composed of 100 parts by mass of the metal magnetic powder of this invention; 5 parts by mass of carbon black; 3 parts by mass of alumina; 15 parts by mass of vinyl chloride resin (MR-110 manufactured by Zeon Corporation); 15 parts by mass of polyurethane resin (the above UR-8200); 1 part by mass of stearic acid; 1 part by mass of acetylacetone; 1 part by mass of methyl ethyl ketone; 190 parts by mass of cyclohexanone; and 80 parts by mass of Toluene.

The respective magnetic and non-magnetic coating materials of the upper and lower layers are produced by blending the ingredients to achieve the prescribed composition, followed by kneading and dispersion using a kneader and a sandgrinder. While the wet-on-wet method is the preferred method of applying the coating material onto the non-magnetic base, which consists of rapidly applying the upper magnetic layer while the lower layer is still moist, other methods may be used. The wet-on-wet multilayer coating method is a publicly-known method.

Generally, in preparing the magnetic coating material, various components such as ferromagnetic metal powder, binder, lubricant, polishing agent, electrostatic charge prevention agent are blended in, diluting the highly concentrated magnetic coating material, and this is the same with respect to the non-magnetic coating material. Magnetic tape having a smooth surface was prepared by using a known multilayer coating application method to obtain a suitable coating thickness, by using permanent magnets to produce a magnetic field to orient the magnetic layer, followed by calendering. By using the aforementioned ferromagnetic powder, non-magnetic base and coating material components, a non-magnetic lower layer can be formed using acicular iron oxide powder, providing a magnetic recording medium with magnetic properties that are not seen in previous such media.

As a specific configuration, adding carbon black to the non-magnetic and magnetic layers has the effect of reducing the surface electrical resistance Rs, decreasing light transmission and imparting an appropriate hardness. This effect can be achieved by adding various types of carbon black, such as for example conductive carbon black or acetylene carbon black and the like. The properties of the carbon black used may be adjusted in accordance with the requirements of the medium.

The minimum constituent unit of the binder for the magnetic recording medium using the magnetic powder of the present invention may be a conventional polyurethane resin and vinyl chloride based, vinyl acetate based, vinyl alcohol, maleic acid, acrylic acid, acrylic acid ester, vinyldine chloride, acrylonitrile, methacrylic acid, methacrylic acid ester, styrene, butadiene, ethylene or other thermosetting polymer or copolymer, phenol resin, epoxy resin, polyurethane hard resin, urea resin, melamine resin, polyester resin and the like, or a combination or mixture of such minimum constituent units.

Of these, it is preferable to use a resin based on a polyurethane resin in which a known method has been used to convert part of the structural skeleton thereof and which has a hydrophilic polar group. The group introduced into the structure thereof can have a major effect on the compatibility and the like of the resin, and so the constituent groups can be changed according to the properties required. Extent resins include UR-8200, UR-8300 and UR-8700 in Toyobo's Vylon series.

Even when resins having the above structures are used for the binder of the magnetic and non-magnetic layers, they may be used in conjunction with resins having a different structure. The resins may be used in combination according to the ratios concerned and the resin acidity, physical properties and compatibility. Examples of those that can be used, in addition to Toyobo's Vylon products cited above, include Zeon Corporation's MR-110, MR-104, MR-105, MR-100, MR-555, and Japan Polyurethane Company's Nippolan N-2301, N-2302 and N-2303.

Electromagnetic Conversion Characteristics

To measure the electromagnetic conversion characteristics, an interactive head and an MR head were attached to a drum tester, the interactive head was used for write operations and the MR head for replay. The recording input was a square wave amplified by a function generator, creating a digital signal that was recorded at a wavelength of 0.35 μm. The output from the MR head was amplified by a pre-amplifier and input to a spectrum analyzer. With C as the output of the 0.35 μm carrier value, the value of the output and a spectral component corresponding to at least the recording wavelength at the time the square wave was input was used to calculate, as an integration value, a value from which output and system noise was subtracted, and the calculated integration value was calculated as a particle noise Np value. Also, the difference between the two was used to calculate the carrier/particle noise ratio.

Magnetic Properties of Magnetic Tape

A model VSM-7P vibrating sample magnetometer (VSM), manufactured by Toei Kogyo Co., Ltd., was used to measure magnetic properties in an externally applied magnetic field of 10 kOe/m (795.8 kA/m).

EXAMPLES

Example 1

3000 ml of pure water was put into a 5000 ml beaker and maintained at 40° C. by a heat regulator while 500 ml of a solution consisting of a 1:4 mixture of a solution of 0.03 mol/l of a cobalt sulfate (special grade reagent) and an aqueous solution of 0.15 mol/l of ferrous sulfate (special grade reagent) was added. Then, granular sodium carbonate was directly added to the solution in an amount constituting three equivalents of carbonic acid, with respect to Fe+Co while the temperature of the solution was adjusted to not exceed ±5° C., to thereby produce a suspension composed chiefly of iron carbonate. After this was matured in aging for 1.5 hours, a hydrogen peroxide solution (30%) was added in an amount whereby 20% of the Fe ions are oxidized, effecting nuclei formation of iron oxyhydroxide. The temperature was elevated to 65° C. and oxidation continued for 1 hour in pure oxygen flowing at 50 ml/min. Then, the gas was switched to nitrogen and aging conducted for 30 minutes.

The temperature was then raised to 40° C. and after the temperature stabilized, as the Al, an aqueous solution of aluminum sulfate was added over a 20-minute period at a rate of 5.0 g/min with growing iron oxyhydroxide. The doping amount of the aluminum aqueous solution was adjusted to be an oxidation ratio of approximately 60%. Also, the flow of pure oxygen was continued at 50 ml/min to complete the oxidation. The oxidation was ended after a small amount of the supernatant was sampled and a potassium hexacyanoferrate solution used to confirm the color had not undergone any change.

After the ending of the oxidation, 300 g of an aqueous sulfuric acid solution of yttrium oxide (containing 2.5 mass % Y) was added. In this way, iron oxyhydroxide powder was obtained which contained Al in solid solution and Y adhered to the surface of the powder particles.

The iron oxyhydroxide cake thus obtained was filtered by a normal method, washed and dried at 130° C. to obtain solid, dry iron oxyhydroxide. 10 g of the solid was then placed in a bucket and water in the form of water vapor added in air at the rate of 1.0 g/m while the iron oxyhydroxide was calcined in the air at 400° C. to obtain iron system oxide composed chiefly of α-iron oxide (hematite).

This iron system oxide was then added to a beaker containing 4000 ml of pure water having a stirrer equipped with a gas supply nozzle. A mixer (a homogenizing mixer manufactured by Tokushu Kika Kogyo Co., Ltd.) was used to stir the iron system oxide at 5000 rpm for 1.0 minute in the beaker to disperse it in the water, after which nitrogen was introduced from the nozzle to purge all of the oxygen. An oxygen meter was used to monitor the oxygen concentration and indicate by a zero-percent reading that all the oxygen was purged. The temperature regulator was then used to set the temperature to 40° C., and after the temperature stabilized the nitrogen was replaced by ammonia gas, which was fed through at a flow rate of 100 ml/min while the α-iron oxide was washed for 15 minutes. This was followed by normal filtering and the washing of the slurry using 10 liters of 0.01 mol/l acetic acid, then the washing of the slurry using 60 liters of ultrapure water followed by drying at 130° C. for 6 hours to obtain α-iron oxide powder.

This α-iron oxide was then placed in a bucket through which air could be passed, which was then mounted into a through type calcining furnace through which hydrogen gas was passed (at a flow rate of 40 l/min) as water in the form of water vapor was added at the rate of 1.0 g/min as reduction processing was conducted for 30 minutes at 400° C. After the end of the reduction period, the supply of water vapor was stopped and the temperature was raised to 600° C. at 10° C./min in a hydrogen atmosphere. Then, high-temperature reduction processing was carried out for 60 minutes during which water in the form of water vapor was added at the rate of 1.0 g/min, producing reduced iron alloy powder.

Next, the atmosphere in the furnace was changed from hydrogen to nitrogen, using a nitrogen flow rate of 50 l/min, as the furnace temperature was reduced to 90° C. at a reduction rate of 20° C./min. At the initial oxide film formation stage, a mixed gas consisting of 50 l/min of nitrogen and 400 ml/min of pure oxygen was fed into the furnace, and water in the form of water vapor was introduced at the rate of 1.0 g/min to form an oxide film in the mixed gas atmosphere composed of water vapor, nitrogen and oxygen. To control the heat given off by the surface oxidation, the supply of air at that stage was gradually increased to raise the oxygen concentration in the atmosphere. The terminal flow rate of pure oxygen was set at 2.0 l/min. Here, the flow rate of the nitrogen was adjusted to maintain the overall amount of gas in the furnace at a more or less constant level. This stabilization processing was conducted in an atmosphere maintained at roughly 90° C.

Next, the temperature was elevated in a nitrogen atmosphere to 450° C. at the rate of 10° C./minute, and, using hydrogen gas (flow rate: 50 l/min), reduction (annealing process) was conducted for 30 minutes while water in the form of water vapor was added at the rate of 1.0 g/min.

Next, the furnace atmosphere was changed from hydrogen to nitrogen using a nitrogen flow rate of 50 l/min), as the furnace temperature was reduced to 45° C. at a reduction rate of 20° C./min. At the initial oxide film formation stage, a mixed gas consisting of 50 l/min of nitrogen and 400 ml/min of pure oxygen was fed into the furnace, and water in the form of water vapor was introduced at the rate of 1.0 g/min to form an oxide film in the mixed gas atmosphere composed of water vapor, nitrogen and oxygen. To control the heat given off by the surface oxidation, the supply of air at that stage was gradually increased to raise the oxygen concentration in the atmosphere. The terminal flow rate of pure oxygen was set at 2.0 l/min. Here, the flow rate of the nitrogen was adjusted to maintain the overall amount of gas in the furnace at a more or less constant level. This stabilization processing was conducted in an atmosphere maintained at roughly 45° C.

The physical properties and values of the particles thus obtained, the bulk magnetic properties of the particles, and of the medium formed using the particles, were examined using the methods described in the foregoing. The constituents of the multilayer magnetic recording medium (base film, lower layer coating, upper layer coating) were those described in the foregoing example (this also applies to the following Examples and Comparative Examples).

Example 2

The same conditions as Example 1 were used except that in the first nuclei formation stage, an aqueous solution of potassium permanganate (0.5 mol/l) was used instead of a hydrogen peroxide solution, and the amount thereof was adjusted to produce an oxidation rate of 20%.

Examples 5, 7, 8

The same conditions as Example 1 were used except that in the first nuclei formation stage, the average major axis length of the precursor was changed by adding various amounts of hydrogen peroxide solution, and the amount of Al in solid solution in the particles and the amount of rare earth metal adhering thereto were also changed.

Examples 3, 4, 6

The same conditions as Example 1 were used except that the amount of cobalt sulfate initially added was varied to change the amount of Co and Al contained in the particles and the type and amount of rare earth metal adhered to the particles.

Comparative Example 1

This was the same as Example 1, except that nuclei were formed conventionally, using oxygen-containing gas.

Comparative Examples 2 to 10 (Except Comparative Example 5)

Nuclei formation was carried out using an oxygen-containing gas, and the nuclei generation ratio was changed as well as the temperature and time used to grow the particles, to thereby manufacture particles using different shape factors. Other than the changes to the individual particle compositions, other conditions were the same as in Example 1.

Comparative Example 5

The same procedure as Example 1 was used, except that the experimental operation of the "washing by the normal method" thereof was halved.

TABLE 1

Magnetic Powder Compositions

|  | Co/Fe at % | Al/Fe + Co mass % | R/(Fe + Co) at % | Component elution by boiling method | | | | | | |
|---|---|---|---|---|---|---|---|---|---|---|
|  |  |  |  | Fe ppm | Co ppm | Al ppm | Na ppm | K ppm | Ca ppm | Mg ppm |
| Example |  |  |  |  |  |  |  |  |  |  |
| 1 | 24.8 | 8.3 | Y: 4.8 | 5 | 6 | 38 | 6.9 | 1.4 | 2.0 | 3.0 |
| 2 | 24.3 | 6.2 | Y: 5.2 | 1 | 8 | 18 | 7.3 | 1.9 | 2.2 | 3.2 |
| 3 | 4.2 | 4.3 | La: 4.9 | 7 | 3 | 2 | 3.8 | 0.9 | 2.1 | 2.6 |
| 4 | 13.9 | 4.6 | Y: 5.1 | 2 | 2 | 16 | 5.2 | 0.4 | 2.4 | 2.9 |
| 5 | 23.9 | 4.8 | Y: 5.5 | 1 | 5 | 13 | 7.4 | 1.3 | 2.3 | 3.4 |
| 6 | 33.4 | 3.3 | Sc: 4.9 | 1 | 9 | 8 | 8.2 | 1.8 | 2.4 | 4.0 |
| 7 | 24.7 | 4.2 | Y: 5.2 | 4 | 4 | 17 | 7.8 | 0.8 | 2.3 | 3.7 |
| 8 | 24.8 | 5.2 | Y: 5.1 | 5 | 5 | 5 | 8.1 | 1.4 | 2.0 | 2.7 |
| Comparative Example |  |  |  |  |  |  |  |  |  |  |
| 1 | 24.8 | 8.2 | Y: 4.6 | 3 | 4 | 62 | 7.2 | 0.8 | 1.8 | 2.8 |
| 2 | 24.7 | 5.2 | Y: 4.8 | 5 | 8 | 19 | 7.7 | 1.5 | 2.4 | 3.4 |
| 3 | 24.5 | 4.5 | Y: 5.3 | 8 | 7 | 12 | 7.3 | 1.6 | 2.4 | 3.3 |
| 4 | 24.3 | 5.2 | Y: 4.6 | 6 | 9 | 15 | 8.2 | 1.1 | 2.7 | 3.2 |
| 5 | 24.8 | 10.5 | Y: 5.8 | 10 | 6 | 142 | 30.2 | 1.9 | 5.8 | 4.8 |
| 6 | 24.2 | 9.3 | Y: 5.3 | 8 | 8 | 65 | 7.5 | 0.9 | 2.5 | 3.9 |
| 7 | 24.3 | 9.4 | Y: 5.5 | 8 | 7 | 78 | 8.2 | 1.6 | 2.7 | 3.8 |
| 8 | 24.6 | 9.4 | Y: 5.2 | 9 | 8 | 73 | 7.8 | 1.5 | 2.2 | 3.7 |
| 9 | 24.6 | 9.2 | Y: 5.4 | 5 | 7 | 75 | 7.4 | 1.4 | 2.4 | 3.9 |
| 10 | 24.7 | 9.4 | Y: 5.3 | 6 | 10 | 74 | 7.6 | 1.0 | 2.6 | 4.0 |

TABLE 2

Particle Properties

| Example | Average major axis length | | Average minor axis length (major width) | | Average minor axis length (minor width) | | Average flat acicularity | |
|---|---|---|---|---|---|---|---|---|
|  | Measured value nm | Standard geometrical deviation | Measured value nm | Standard geometrical deviation | Measured value nm | Standard geometrical deviation | Calculated value — | Standard geometrical deviation |
| 1 | 23.27 | 1.58 | 6.52 | 1.46 | 5.16 | 1.31 | 1.26 | 1.33 |
| 2 | 30.46 | 1.52 | 7.99 | 1.51 | 6.43 | 1.42 | 1.24 | 1.31 |

TABLE 2-continued

| | Particle Properties | | | | | | | |
|---|---|---|---|---|---|---|---|---|
| 3 | 42.96 | 1.82 | 7.37 | 1.48 | 4.55 | 1.52 | 1.62 | 1.71 |
| 4 | 40.03 | 1.03 | 8.08 | 1.54 | 6.61 | 1.37 | 1.22 | 1.28 |
| 5 | 44.62 | 1.51 | 7.47 | 1.44 | 4.49 | 1.50 | 1.66 | 1.73 |
| 6 | 44.97 | 1.03 | 7.82 | 1.09 | 6.09 | 1.10 | 1.28 | 1.16 |
| 7 | 59.36 | 1.50 | 10.63 | 1.50 | 7.32 | 1.47 | 1.45 | 1.58 |
| 8 | 91.30 | 1.56 | 13.96 | 1.50 | 10.12 | 1.42 | 1.38 | 1.48 |

| | Cross-sectional area | | Particle volume | | | | | | | |
|---|---|---|---|---|---|---|---|---|---|---|
| Example | Calculated value $nm^2$ | Standard geometrical deviation | Calculated value $nm^3$ | Standard geometrical deviation | Axial ratio | Crystallite size nm | C/D | BET $m^2/g$ | Particle pH | Ignition temperature °C | TAP g/cc |
| 1 | 26.41 | 1.83 | 614.4 | 1.87 | 3.6 | 7.3 | 1.12 | 111.3 | 8.8 | 135.0 | 0.415 |
| 2 | 40.34 | 1.88 | 1228.6 | 2.49 | 3.8 | 8.2 | 1.03 | 100.4 | 8.9 | 148.3 | 0.423 |
| 3 | 26.33 | 1.67 | 1130.9 | 2.25 | 5.8 | 10.5 | 1.42 | 80.8 | 9.0 | 150.6 | 0.457 |
| 4 | 41.91 | 1.99 | 1677.7 | 2.02 | 5.0 | 9.3 | 1.15 | 82.3 | 9.2 | 149.4 | 0.489 |
| 5 | 26.37 | 1.59 | 1176.8 | 2.18 | 6.0 | 9.8 | 1.31 | 78.7 | 9.1 | 145.6 | 0.445 |
| 6 | 37.40 | 1.17 | 1681.9 | 1.18 | 5.8 | 10.2 | 1.30 | 75.3 | 8.7 | 147.9 | 0.458 |
| 7 | 61.11 | 1.97 | 3627.1 | 2.45 | 5.6 | 11.4 | 1.07 | 70.2 | 9.7 | 158.7 | 0.479 |
| 8 | 110.99 | 1.94 | 10133.1 | 2.93 | 6.5 | 14.1 | 1.01 | 56.0 | 9.5 | 167.2 | 0.512 |

| | Average major axis length | | Average minor axis length (major width) | | Average minor axis length (minor width) | | Average flat acicularity | |
|---|---|---|---|---|---|---|---|---|
| Comparative Example | Measured value nm | Standard geometrical deviation | Measured value nm | Standard geometrical deviation | Measured value nm | Standard geometrical deviation | Calculated value — | Standard geometrical deviation |
| 1 | 43.12 | 1.35 | 9.60 | 2.24 | 6.12 | 1.89 | 1.57 | 1.88 |
| 2 | 44.97 | 1.29 | 9.23 | 1.88 | 5.99 | 2.12 | 1.54 | 1.31 |
| 3 | 61.61 | 1.59 | 13.89 | 1.58 | 6.62 | 1.53 | 2.10 | 1.92 |
| 4 | 24.55 | 1.48 | 8.20 | 1.89 | 6.50 | 2.14 | 1.26 | 1.34 |
| 5 | 59.77 | 1.50 | 10.95 | 1.57 | 7.59 | 1.52 | 1.44 | 1.54 |
| 6 | 31.05 | 1.53 | 10.62 | 1.73 | 6.80 | 1.68 | 1.56 | 1.68 |
| 7 | 33.57 | 1.45 | 10.80 | 1.67 | 6.23 | 1.63 | 1.73 | 1.65 |
| 8 | 26.53 | 1.43 | 9.50 | 1.52 | 6.20 | 1.94 | 1.53 | 1.93 |
| 9 | 30.02 | 1.41 | 10.19 | 1.68 | 7.89 | 1.84 | 1.29 | 2.04 |
| 10 | 32.99 | 1.38 | 8.88 | 1.78 | 6.79 | 1.75 | 1.31 | 1.89 |

| | Cross-sectional area | | Particle volume | | | | | | | | |
|---|---|---|---|---|---|---|---|---|---|---|---|
| Comparative Example | Calculated value $nm^2$ | Standard geometrical deviation | Calculated value $nm^3$ | Standard geometrical deviation | Axial ratio | Crystallite size nm | C/D | BET $m^2/g$ | Particle pH | Ignition temperature °C | TAP g/cc |
| 1 | 46.14 | 2.93 | 1989.7 | 3.82 | 4.5 | 9.8 | 1.02 | 111.4 | 8.2 | 138.7 | 0.379 |
| 2 | 43.40 | 2.89 | 1951.7 | 3.02 | 4.9 | 9.5 | 1.03 | 94.2 | 8.5 | 140.8 | 0.372 |
| 3 | 72.19 | 2.19 | 4447.5 | 2.19 | 4.4 | 13.9 | 1.00 | 70.4 | 9.2 | 149.3 | 0.458 |
| 4 | 41.86 | 2.72 | 1027.7 | 3.24 | 3.0 | 8.4 | 1.02 | 115.3 | 8.6 | 127.9 | 0.392 |
| 5 | 65.24 | 2.37 | 3899.6 | 3.03 | 5.5 | 11.3 | 1.03 | 87.8 | 10.3 | 141.3 | 0.477 |
| 6 | 56.72 | 2.68 | 1761.1 | 4.23 | 2.9 | 10.8 | 1.02 | 106.4 | 8.9 | 122.9 | 0.314 |
| 7 | 52.84 | 2.75 | 1774.0 | 3.57 | 3.1 | 11.2 | 1.04 | 107.8 | 8.8 | 118.4 | 0.287 |
| 8 | 46.26 | 2.92 | 1227.3 | 2.43 | 2.8 | 8.6 | 0.91 | 116.4 | 8.7 | 116.3 | 0.382 |
| 9 | 63.15 | 2.73 | 1895.6 | 2.68 | 2.9 | 10.3 | 1.01 | 104.8 | 8.6 | 124.9 | 0.393 |
| 10 | 47.36 | 3.04 | 1562.3 | 3.74 | 3.7 | 9.2 | 1.04 | 105.3 | 8.7 | 115.3 | 0.383 |

TABLE 3

| | Powder Magnetic Properties | | | | | | | | |
|---|---|---|---|---|---|---|---|---|---|
| | Measured values of powder magnetic properties | | | | Magnetic properties per unit volume | | | | |
| | Hc | | σs | | Hc/V | | | | |
| | Oe | kA/m | $Am^2/kg$ | SQ | Oe | kA/m | σs/V | σs/BET | Δσs % |
| Example | | | | | | | | | |
| 1 | 1012 | 80.5 | 90.3 | 0.44 | 1.647 | 0.131 | 0.147 | 0.811 | 16.2 |
| 2 | 1567 | 124.7 | 102.3 | 0.47 | 1.275 | 0.101 | 0.083 | 1.019 | 12.3 |
| 3 | 1923 | 153.0 | 109.1 | 0.48 | 1.146 | 0.091 | 0.065 | 1.326 | 8.5 |
| 4 | 2015 | 160.3 | 122.8 | 0.51 | 1.782 | 0.142 | 0.109 | 1.520 | 7.8 |

TABLE 3-continued

| | Powder Magnetic Properties | | | | | | | | |
|---|---|---|---|---|---|---|---|---|---|
| | Measured values of powder magnetic properties | | | | Magnetic properties per unit volume | | | | |
| | Hc | | σs | | Hc/V | | | | |
| | Oe | kA/m | Am²/kg | SQ | Oe | kA/m | σs/V | σs/BET | Δσs % |
| 5 | 2129 | 169.4 | 124.6 | 0.50 | 1.809 | 0.144 | 0.106 | 1.583 | 8.2 |
| 6 | 2253 | 179.3 | 127.8 | 0.52 | 1.340 | 0.107 | 0.076 | 1.697 | 7.1 |
| 7 | 2548 | 202.8 | 133.9 | 0.53 | 0.702 | 0.056 | 0.037 | 1.907 | 5.2 |
| 8 | 2689 | 214.0 | 145.3 | 0.52 | 0.265 | 0.021 | 0.014 | 2.595 | 4.0 |
| Comparative Example | | | | | | | | | |
| 1 | 1674 | 133.2 | 93.2 | 0.46 | 0.841 | 0.067 | 0.047 | 0.837 | 13.5 |
| 2 | 1875 | 149.2 | 111.5 | 0.49 | 0.961 | 0.076 | 0.057 | 1.184 | 10.8 |
| 3 | 2404 | 191.3 | 123.7 | 0.50 | 0.541 | 0.043 | 0.028 | 1.757 | 5.2 |
| 4 | 803 | 63.9 | 92.7 | 0.40 | 0.781 | 0.062 | 0.090 | 0.804 | 18.8 |
| 5 | 2185 | 173.9 | 110.5 | 0.49 | 0.560 | 0.045 | 0.028 | 1.259 | 11.1 |
| 6 | 972 | 77.3 | 88.3 | 0.44 | 0.552 | 0.044 | 0.050 | 0.830 | 8.2 |
| 7 | 1558 | 124.0 | 94.3 | 0.48 | 0.878 | 0.070 | 0.053 | 0.875 | 9.2 |
| 8 | 1009 | 80.3 | 85.1 | 0.41 | 0.822 | 0.065 | 0.069 | 0.731 | 13.9 |
| 9 | 1552 | 123.5 | 91.0 | 0.43 | 0.819 | 0.065 | 0.048 | 0.868 | 11.8 |
| 10 | 1685 | 134.1 | 90.5 | 0.46 | 1.079 | 0.086 | 0.058 | 0.859 | 12.3 |

TABLE 4

| | Multilayer Medium Properties | | | | | |
|---|---|---|---|---|---|---|
| | Hc | | | | Np | C/Nt |
| | Oe | kA/m | SFDx | ΔBm % | dB | dB |
| Example | | | | | | |
| 1 | 1451 | 115.5 | 0.973 | 3.2 | −10.0 | 3.6 |
| 2 | 1842 | 146.6 | 0.752 | 2.5 | −8.5 | 3.7 |
| 3 | 2354 | 187.3 | 0.659 | 2.2 | −8.2 | 3.7 |
| 4 | 2451 | 195.0 | 0.674 | 2.4 | −8.4 | 4.2 |
| 5 | 2514 | 200.1 | 0.523 | 2.0 | −8.2 | 4.8 |
| 6 | 2558 | 203.6 | 0.559 | 1.9 | −7.8 | 5.2 |
| 7 | 2741 | 218.1 | 0.421 | 1.9 | −6.3 | 4.6 |
| 8 | 2841 | 226.1 | 0.415 | 1.6 | −5.2 | 4.3 |
| Comparative Example | | | | | | |
| 1 | 1601 | 127.4 | 1.054 | 3.8 | −5.2 | 2.2 |
| 2 | 1811 | 144.1 | 0.852 | 3.2 | −4.5 | 2.7 |
| 3 | 2345 | 186.6 | 0.889 | 2.8 | −4.2 | 3.2 |
| 4 | 987 | 78.5 | 1.108 | 5.2 | −5.5 | 1.6 |
| 5 | 2423 | 192.8 | 0.834 | 3.8 | −3.8 | 2.9 |
| 6 | 1243 | 98.9 | 1.085 | 3.1 | −6.3 | 2.0 |
| 7 | 1578 | 125.6 | 0.944 | 2.9 | −3.2 | 1.5 |
| 8 | 1121 | 89.2 | 1.036 | 3.9 | −5.3 | 1.8 |
| 9 | 1585 | 126.1 | 0.973 | 3.0 | −6.2 | 3.3 |
| 10 | 1687 | 134.2 | 0.932 | 3.2 | −6.3 | 3.0 |

What is claimed is:

1. A ferromagnetic metal powder having Fe as a main component comprised of acicular particles having a cross-section perpendicular to particle major axis that is substantially round or elliptical, wherein a standard geometrical deviation indicating variation in cross-sectional area thereof is within a range of 1.01 to 3.0, wherein the acicular particles have an axial ratio of not less than 3.6.

2. A ferromagnetic powder having Fe as a main component comprised of acicular particles having a cross-section perpendicular to particle major axis that is substantially round or elliptical, wherein a standard geometrical deviation indicating variation in particle volume thereof is within a range of 1.01 to 4.0, wherein the acicular particles have an axial ratio of not less than 3.6.

3. A ferromagnetic metal powder having Fe as a main component comprised of acicular particles having a cross-section perpendicular to particle major axis that is substantially round or elliptical, wherein an average flat acicularity (major width/minor width) is within a range of more than 1.0 to 2.5, and a standard geometrical deviation indicating variation in said flat acicularity is within a range of 1.01 to 2.0, wherein the acicular particles have an axial ratio of not less than 3.6.

4. The ferromagnetic metal powder according to claim 1, wherein the major axis length is not more than 100 nm and a C/D ratio between Fe (110) crystallite diameter C and average major width D is larger than 1.

5. The ferromagnetic metal powder according to claim 1, wherein Fe (110) crystallite diameter is not more than 12 nm and TAP density is 0.30 g/cc or more.

6. The ferromagnetic metal powder according to claim 1, wherein when 1 g of the magnetic powder is maintained in 100 ml of pure water for 5 minutes at 100° C., an amount of eluted Al is not more than 100 ppm.

7. The ferromagnetic metal powder according to claim 1, formed of iron oxyhydroxide as a starting material obtained by a process comprising reacting a ferrous and cobalt salt solution with an alkali hydroxide solution and, following neutralization, adding an excess of alkali carbonate to form iron carbonate, which is matured in ageing; and then adding an oxidizing agent in an amount adjusted to oxidize up to 25% of the total Fe component in the solution to accelerate the formation of iron oxyhydroxide nuclei, after which the iron oxyhydroxide is grown while being doped with an aqueous solution of aluminum within an oxidation ratio of up to 85%, and, following the completion of the oxidation, coating with a rare earth element (defined to include Y).

8. A coating material containing the ferromagnetic metal powder according to claim 1.

9. A magnetic recording medium in which a magnetic layer is formed using the ferromagnetic metal powder according to claim 1.

* * * * *